US008290840B2

(12) United States Patent
Kasower

(10) Patent No.: US 8,290,840 B2
(45) Date of Patent: *Oct. 16, 2012

(54) METHOD FOR DETERMINING INSURANCE BENEFITS AND PREMIUMS FROM DYNAMIC CREDIT INFORMATION

(75) Inventor: Sheldon Kasower, Bell Canyon, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 12/117,275

(22) Filed: May 8, 2008

(65) Prior Publication Data

US 2008/0235063 A1    Sep. 25, 2008

Related U.S. Application Data

(63) Continuation-in-part of application No. 10/724,315, filed on Nov. 26, 2003.

(60) Provisional application No. 60/429,951, filed on Nov. 27, 2002.

(51) Int. Cl.
G06Q 40/00 (2012.01)

(52) U.S. Cl. ............................................. 705/35; 705/38

(58) Field of Classification Search ................ 705/1, 38, 705/39, 35
See application file for complete search history.

(56) References Cited

U.S. PATENT DOCUMENTS

| | | | |
|---|---|---|---|
| 5,590,038 A | 12/1996 | Pitroda | |
| 5,640,577 A | 6/1997 | Scharmer | |
| 5,844,218 A | 12/1998 | Kawan et al. | |
| 5,956,693 A | 9/1999 | Geerlings | |
| 5,990,038 A | 11/1999 | Suga et al. | |
| 6,038,551 A | 3/2000 | Barlow et al. | |
| 6,311,169 B2 | 10/2001 | Duhon | |
| 6,386,444 B1 * | 5/2002 | Sullivan | ......................... 235/379 |

(Continued)

FOREIGN PATENT DOCUMENTS

WO    WO 01/84281    11/2001

OTHER PUBLICATIONS

"Consumers Gain Immediate and Full Access to Credit Score Used by Majority of U.S. Lenders," Mar. 19, 2001, p. 1, PR Newswire, ProQuest copy.

(Continued)

*Primary Examiner* — Thomas Dixon
*Assistant Examiner* — Benjamin S Fields
(74) *Attorney, Agent, or Firm* — Knobbe Martens Olson & Bear, LLP

(57) ABSTRACT

Methods for obtaining credit life insurance for an individual via a service organization are provided. In one embodiment, the method includes the steps of: 1) registering the individual with the service organization via a computer system in a computer network; 2) accessing credit information on the individual via the computer system in the computer network and determining the total debt of the individual; 3) determining the amount of debt to be covered by credit life insurance benefits; 4) creating a data base including insurance companies that provide credit life insurance benefits, the data base further including the premiums that the insurance companies charge for issuing their credit life insurance; 5) selecting specific coverage with required specific premiums; 6) obtaining the individual's approval of the required specific premiums via the computer system in the computer network; and 7) obtaining credit life insurance benefits for the individual.

14 Claims, 16 Drawing Sheets

U.S. PATENT DOCUMENTS

| | | | |
|---|---|---|---|
| 6,745,938 B2 * | 6/2004 | Sullivan | 235/379 |
| 6,804,346 B1 | 10/2004 | Mewhinney | |
| 6,910,624 B1 | 6/2005 | Natsuno | |
| 6,985,887 B1 | 1/2006 | Sunstein et al. | |
| 7,028,052 B2 | 4/2006 | Chapman et al. | |
| 7,072,909 B2 | 7/2006 | Polk | |
| 7,281,652 B2 | 10/2007 | Foss | |
| 7,330,835 B2 | 2/2008 | Deggendorf | |
| 7,366,694 B2 * | 4/2008 | Lazerson | 705/38 |
| 7,386,511 B2 | 6/2008 | Buchanan et al. | |
| 7,451,113 B1 | 11/2008 | Kasower | |
| 7,529,698 B2 | 5/2009 | Joao | |
| 7,647,274 B2 | 1/2010 | Peterson et al. | |
| 7,689,505 B2 | 3/2010 | Kasower | |
| 2002/0069122 A1 | 6/2002 | Yun et al. | |
| 2002/0077964 A1 | 6/2002 | Brody et al. | |
| 2002/0128962 A1 | 9/2002 | Kasower | |
| 2002/0169747 A1 | 11/2002 | Chapman et al. | |
| 2002/0173994 A1 | 11/2002 | Ferguson, III | |
| 2002/0194120 A1 | 12/2002 | Russell et al. | |
| 2003/0009418 A1 | 1/2003 | Green et al. | |
| 2003/0097342 A1 | 5/2003 | Whittingtom | |
| 2003/0187768 A1 * | 10/2003 | Ryan et al. | 705/35 |
| 2004/0044563 A1 | 3/2004 | Stein | |
| 2004/0111359 A1 | 6/2004 | Hudock | |
| 2004/0177035 A1 | 9/2004 | Silva | |
| 2004/0236688 A1 | 11/2004 | Bozeman | |
| 2006/0106670 A1 | 5/2006 | Cai et al. | |
| 2007/0112668 A1 | 5/2007 | Celano et al. | |
| 2007/0226047 A1 | 9/2007 | Ward | |
| 2007/0262140 A1 | 11/2007 | Long, Sr. | |
| 2008/0059352 A1 | 3/2008 | Chandran | |
| 2008/0091519 A1 | 4/2008 | Foss | |
| 2008/0133278 A1 * | 6/2008 | Stanfield | 705/4 |
| 2008/0221972 A1 | 9/2008 | Megdal | |
| 2008/0222027 A1 | 9/2008 | Megdal et al. | |
| 2008/0270209 A1 | 10/2008 | Mauseth et al. | |
| 2008/0294501 A1 | 11/2008 | Rennich et al. | |
| 2009/0248573 A1 | 10/2009 | Haggerty et al. | |
| 2010/0023448 A1 | 1/2010 | Eze | |

OTHER PUBLICATIONS

Co-Pending U.S. Appl. No. 10/665,244, filed Sep. 20, 2003.
Co-Pending U.S. Appl. No. 10/724,315, filed Nov. 26, 2003 and Supplemental Preliminary Amendment filed May 5, 2008 therein.
Ettorre, Paul Kahn on Exceptional Marketing. Management Review, vol. 38(11), Nov. 1994, pp. 48-51.
Ideon, Credit-Card Registry That Bellyflopped this Year, Is Drawing some Bottom-Fishers, The Wall Street Journal, Aug. 21, 1995, p. C2.

* cited by examiner

CRADLE

CRADLE

CRADLE

FIGURE 2

CRADLE<sup>SM</sup>
Credit Report Accumulated Debt Liability Exposure

---

Log In

User Name: [ JohnSmith ]
Password: [ ]
[Log In] — 56

Not a member? Click here to register.

FIG. 3

CRADLE[SM]
Credit Report Accumulated Debt Liability Exposure

---

Personal Information

| | | | |
|---|---|---|---|
| Name: | John | H | Smith |
| Home Address: | 123 Main Street | | |
| | Los Angeles | CA | 92374 |

Date of Birth: 01 / 01 / 2003

Email: John.Smith@aol.

Beneficiary: Jane Smith

← 22A

Billing Information

Credit Card Type: ● Visa ○ Mastercard ○ Discover ○ American Express

Credit Card Number: 4111111111111111

Expires: 01 / 2003

Name as it appears on card: John Smith

Billing Address for Card: 123 Main Street

Los Angeles | CA | 92374

CRADLE℠
Credit Report Accumulated Debt Liability Exposure

---

Agreement

Consumer authorizes Mighty Net, Inc. to charge the calculated monthly premium to a valid charge card as indicated by the consumer including but not limited to Mastercard, Visa, Discover and American Express. Premium collected via the charge card is fully earned and not subject to cancellation. Consumer hereby authorizes Mighty Net, Inc. to obtain credit balance indebtedness from one of the three major credit bureaus (TransUnion, Experian or Equifax) for the purpose of calculating credit life monthly insurance premiums. The consumer also agrees to pay the company the appropriate premium each period per the terms of the accepted credit life insurance benefits account.

[ I Accept ]

FIGURE 5

CRADLE<sup>SM</sup>
Credit Report Accumulated Debt Liability Exposure

Hello John Smith

Acme Insurance Current Debt Coverage

| Current Coverage: | $36,000 |
|---|---|
| Account Number: | 78123468ASG |
| Insured Period: | Month-to-Month |
| Current Premium: | $2 per month per $1,000 |
| Mortgage Loan(s) Option: | ☐ Check this box to add mortgage loan(s) coverage to your next premium. |
| Automobile Loan(s) Option: | ☐ Check this box to add automobile loan(s) coverage to your next premium. |

| Close | Record Changes |

FIGURE 6

Sent: Thursday, August 25, 2003 3:32 PM
To: John.Smith@aol.com
From: administration@cradle.com
Subject: CRADLE Account - New Premium Your CRADLE credit life insurance benefits account premium and coverage is about to change.

You current premium does not cover your mortgage loan(s) or automobile loan(s). See your account details page to change this option.

Please log in to view your updated CRADLE insurance premium and coverage. Your new premium coverage will be charged to your account on September 1, 2003.

FIGURE 7

CRADLE<sup>SM</sup>
Credit Report Accumulated Debt Liability Exposure

---

Hello John Smith

Your current total debt is: $35,875
Based on your TransUnion credit file as of September 1, 2003.
Your last debt insurance coverage premium was: $72.00
Based on $36,000 at $2.00 per month per $1,000. Provided by Acme Insurance.
Billed on September 1, 2003. For details, click here.
To view your debt and premium history, please click here.
To change your billing information, please click here.
To cancel your account, please click here.

FIGURE 8

CRADLE<sup>SM</sup>
Credit Report Accumulated Debt Liability Exposure

---

Policy Details

Thank you!

- Your credit life insurance benefits account will be issued by Acme Insurance at the rate of $2.00 per $1,000.00 of indebtedness per month and charged automatically to the credit card you provided.

- Your Acme Insurance Credit Life Insurance Benefits account number is 78123468ASG.

- Your next premium will be calculated on May 1, 2003.

- Your account and coverage will continue in force until cancelled or lapsed, whichever may occur first.

Your first premium will be:

> $30.00 based on a current indebtedness of $14,987.00 as determined from your TransUnion credit file.
  >
  > ☐ OPTIONAL: Add an additional $50 to cover your existing $25,000 mortgage loan.
  >
  > ☐ OPTIONAL: Add an additional $10 to cover your existing $4,780 automobile loan.

Click the button below to accept this policy.

[ I Accept ]

FIGURE 9

CRADLE<sup>SM</sup>
Credit Report Accumulated Debt Liability Exposure

---

Hello John Smith

Premium and Debtedness History

| Date | Premium | Debt | Provider | Account Number |
|---|---|---|---|---|
| Apr 01, 2003 | $30.00 | $14,987.00 | Acme Insurance | 78123468ASG |
| May 01, 2003 | $38.00 | $18,777.00 | Acme Insurance | 78123468ASG |
| Jun 01, 2003 | $34.00 | $17,624.00 | Acme Insurance | 78123468ASG |
| Jul 01, 2003 | $48.00 | $26,154.00 | Gold Coast Insurance | AGS234876 |
| Aug 01, 2003 | $62.00 | $33,987.00 | Gold Coast Insurance | AGS234876 |
| Sep 01, 2003 | $72.00 | $35,875.00 | Acme Insurance | 78123468ASG |

[Close]

FIGURE 10

Sent: Thursday, October 23, 2003 3:32 PM
To: John.Smith@aol.com
From: administration@cradle.com
Subject: CRADLE Account - Coverage Lapse Your CRADLE credit life insurance benefits coverage is about to lapse.

We were unable to charge your November 2003 CRADLE insurance premium to the credit card you supplied for billing purposes (Visa, card number XXXXXXXX5063). You may contact your credit card company for more details.

Please log in and change or update your billing information so that we may process your CRADLE insurance premium. You must respond by 10/31/2003 in order to keep your coverage active.

FIGURE 11

CRADLE[SM]
Credit Report Accumulated Debt Liability Exposure

---

Lapsed/Cancelled Account

Hello John Smith

We're sorry. It appears your coverage has lapsed or been cancelled. If you wish to re-register for an account, please click here.

FIGURE 12

Sent: Thursday, October 23, 2003 3:32 PM
To: John.Smith@aol.com
From: administration@cradle.com
Subject: CRADLE Account - Coverage Lapse Your CRADLE credit life insurance benefits coverage has lapsed as of 10/31/2003.

If you wish to reactivate your CRADLE credit life insurance benefits account, please re-register at <insert web address>

FIGURE 13

CRADLE[SM]
Credit Report Accumulated Debt Liability Exposure

---

Hello John Smith

Billing Information

| | |
|---|---|
| Credit Card Type: | ◉ Visa  ○ Mastercard  ○ Discover  ○ American Express |
| Credit Card Number: | 4111111111111111 |
| Expires: | 01 ▽ / 2003 ▽ |
| Name as it appears on card: | John Smith |
| Billing Address for Card: | 123 Main Street |
| | Los Angeles    CA    92374 |

[ Save Changes ]

FIGURE 14

CRADLE[SM]
Credit Report Accumulated Debt Liability Exposure

---

Cancellation of Policy

Hello John Smith.

We're sorry you are choosing to cancel your account. By clicking the Cancel button below, your account will be immediately cancelled and no further premiums charged.

| No, do not cancel my account | Yes, cancel my account |

METHOD FOR DETERMINING INSURANCE BENEFITS AND PREMIUMS FROM DYNAMIC CREDIT INFORMATION

CROSS REFERENCE TO RELATED APPLICATIONS

This application is a Continuation-in-Part of Ser. No. 10/724,315, filed Nov. 26, 2003, which claims the benefit of Provisional Application Ser. No. 60/429,951, filed Nov. 27, 2002 each of which is incorporated by reference in their entirety.

FIELD

The embodiments described herein relate to the field of credit life insurance benefits and, in particular, to an online (Internet) based method of purchasing credit life insurance benefits.

DESCRIPTION OF RELATED ART

Typically, when an individual purchases goods, property, or services on credit, the individual may also purchase a credit life insurance benefits policy wherein the policy's premium is based upon the amount of indebtedness incurred for that purchase. If the individual dies before the indebtedness is paid, the insurance company will pay the full balance then owed. Depending on the type of credit life insurance benefits policy, if the individual is hospitalized or laid off from work before the indebtedness is paid, the insurance company will make the periodic debt payments during the hospitalization or lay off from work period pursuant to the terms of the policy.

If the individual takes out a mortgage, the individual may purchase credit life insurance to cover the mortgage payments. If the individual purchases an automobile on credit, the individual may purchase credit life insurance to cover the loan payments. If the individual purchases furniture or appliances on credit, the individual may purchase credit life insurance on the loan payments. In some instances the individual may purchase credit life insurance to cover the balance owed on certain credit cards without regard to the nature of the purchases, which comprise the balance owed.

Each granting of credit can be covered by a separate credit life insurance policy. In some cases the respective lender or credit grantor requires the credit life insurance as a condition of making the loan or granting the credit. In many cases, the credit life insurance is not factually mandatory, but the individual is led to believe that credit life insurance is mandatory and therefore purchases the insurance. Typically, the premiums for credit life insurance policies are astronomically high when compared to other life insurance policies.

In applicant's co-pending application Ser. No. 09/846,616 "Card Management System and Method Therefore" filed on May 1, 2001, a card management system was disclosed and is herewith incorporated into this application by reference. Embodiments of this application disclose a method and system for online credit card and social card management, wherein the card is issued to an individual who is a card user by a card issuing organization. The individual, using his own computer, interfaces through the Internet with a card management organization to a computer system within the card management organization and requests certain activities pertaining to his card such as: change of address, request for change in credit limit, dispute over a billing, etc. The computer system includes a computer program that processes the individual's requests pertaining to the individual's cards and informs the card issuer and/or credit reporting bureaus of the individual's requests via the Internet. The computer system thereafter informs the individual via the Internet that the card issuer and/or credit-reporting bureau has received the request.

These embodiments of co-pending application Ser. No. 09/846,616 allow an individual to establish contact with credit grantors via the Internet. However it does not provide a means for obtaining the individual's credit report, or for obtaining a consolidated report of the individual's total indebtedness.

The embodiments described herein provide an online (Internet based) method for determining an individual's total indebtedness.

It is another object of the embodiments described herein to provide an online (Internet based) method for purchasing credit life insurance benefits consolidation services.

It is a further object of the embodiments described herein to provide a method of allowing a card and/or a credit management organization or a credit watch or credit monitoring organization, which have a means to obtain credit information from credit reporting bureaus, to provide credit life insurance benefits consolidation services for an individual.

SUMMARY

The embodiments described herein are directed to a method of obtaining credit life insurance benefits for an individual by means of a service organization. In detail, the steps include:

1. Registering the individual with the service organization via a computer system in a computer network. An additional accomplishment during registration is providing authorization to the service organization by the individual to authorize a charge, and charge service organization fees and credit life insurance premiums to the individual's valid credit card.
2. Providing authorization to the service organization from the individual to contact a credit reporting bureau to secure credit data providing the total debt of the individual. This step includes the accessing of periodic credit balance (total indebtedness on the credit report) information of the individual by means of the computer system in the computer network and determining the total debt of the individual based on the credit report.
3. Determining the amount of debt to be covered by credit life insurance benefits.
4. Creating and periodically updating a data base identifying insurance companies that may provide credit life insurance, the data base further including the premiums that the insurance companies charge for issuing their credit life insurance policies;
5. Selecting a specific insurance company with required specific premiums.
6. Obtaining the individuals approval of the required specific premiums via the computer system in the computer network.
7. Requesting that the insurance company underwrite the credit life insurance benefits as determined by the collective selected indebtedness of all the individuals covered by the service organization for that state.

Upon application, the initial premium will be calculated from the selected debt balances on the credit report, and the selected credit card charged. The step of accessing credit information of the individual by means of the computer system in the computer network and determining any change in the total debt of the individual is periodically repeated and the value of the premium owed by the individual is adjusted based upon the change in total debt. Of course, the database is periodically updated to include any new insurance companies and to update the charges that previously entered insurance company's charge for issuing their credit life insurance.

The novel features which are believed to be characteristic of the embodiments described herein, both as to its organization and method of operation, together with further objects and advantages thereof, will be better understood from the accompanying drawings. It is to expressly understood, however, that the drawings are for the purpose of illustration and description only and are not intended as a definition of the limits or scope of the embodiments described herein.

BRIEF DESCRIPTION OF THE DRAWINGS

FIG. 1A is the flow chart for an individual to subscribe to the service.

FIG. 1B is the flow chart for the determination of an individual's debt, determination of credit insurance benefits premium and the storage of information in a database.

FIG. 1C is the flow chart allowing an individual to view actions taken on behalf of the individual, to change or terminate coverage, etc.

FIG. 2 is a computer terminal screen for signing on to the program.

FIG. 3 is a computer terminal screen for registering personal information and providing billing information.

FIG. 4 is a computer terminal screen authorizing the service organization to obtain the individual's total indebtedness from their credit file provided by the credit bureau(s) and agreeing to accept the terms and conditions of the service and the credit life insurance benefits.

FIG. 5 is a computer terminal screen for displaying current debt coverage.

FIG. 6 is an Email message notifying the individual of a change in debt coverage.

FIG. 7 is a computer terminal screen for displaying updated indebtedness information.

FIG. 8 is a computer terminal screen for accepting new credit life insurance benefits FIG. 9 is a computer terminal screen for displaying indebtedness history.

FIG. 10 is an email message for informing the individual that the credit card designated during registration has insufficient funds to cover fees and or premiums.

FIG. 11 is a computer terminal screen for informing the individual that the credit life insurance benefits has lapsed and offering the individual the opportunity to reregister for new credit life insurance benefits.

FIG. 12 is an email message informing the individual that the credit life insurance benefits have lapsed and providing instructions about reregistering for new credit life insurance benefits.

FIG. 13 is a computer terminal screen for updating billing information for the individual.

FIG. 14 is a computer terminal screen for the individual to cancel the credit life insurance benefits.

DETAILED DESCRIPTION

The embodiments described herein cover an Internet online method wherein an individual using his own personal computer may register with a service organization, which determines from the individual's credit report all of the individual's credit life insurance benefits needs to be covered under a single account premium. The amount will have a floating premium based upon the total indebtedness for the premium period. The premium period, to be selected by the individual or determined by the service organization, which can be weekly, monthly or quarterly, or any other, agreed upon period of time.

Most credit life insurance companies will be unconcerned that the total indebtedness is comprised of multiple items, because the premium is based upon the total indebtedness during the premium period. Generally, the larger the total amount of indebtedness being covered by a single credit life insurance benefit policy, the smaller the premium per dollar of indebtedness. In other words, an individual can expect to pay a significantly smaller premium for a single $10,000 policy than for ten $1,000 policies.

Figure 1A:
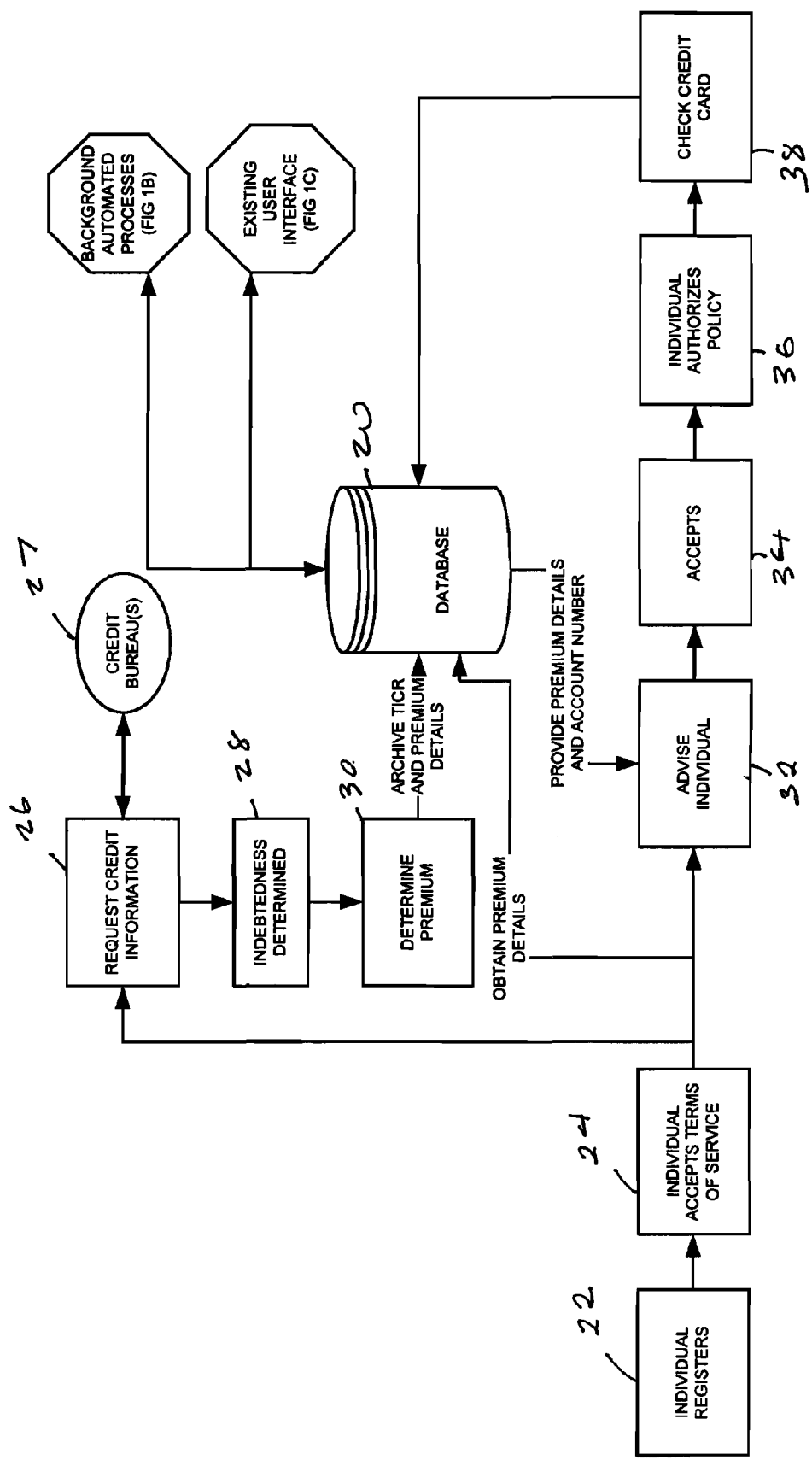
FIG. 1A is a first part of an overall flow chart of the credit life insurance benefits consolidation services organization's computer program. In particular.
Figure 1B:
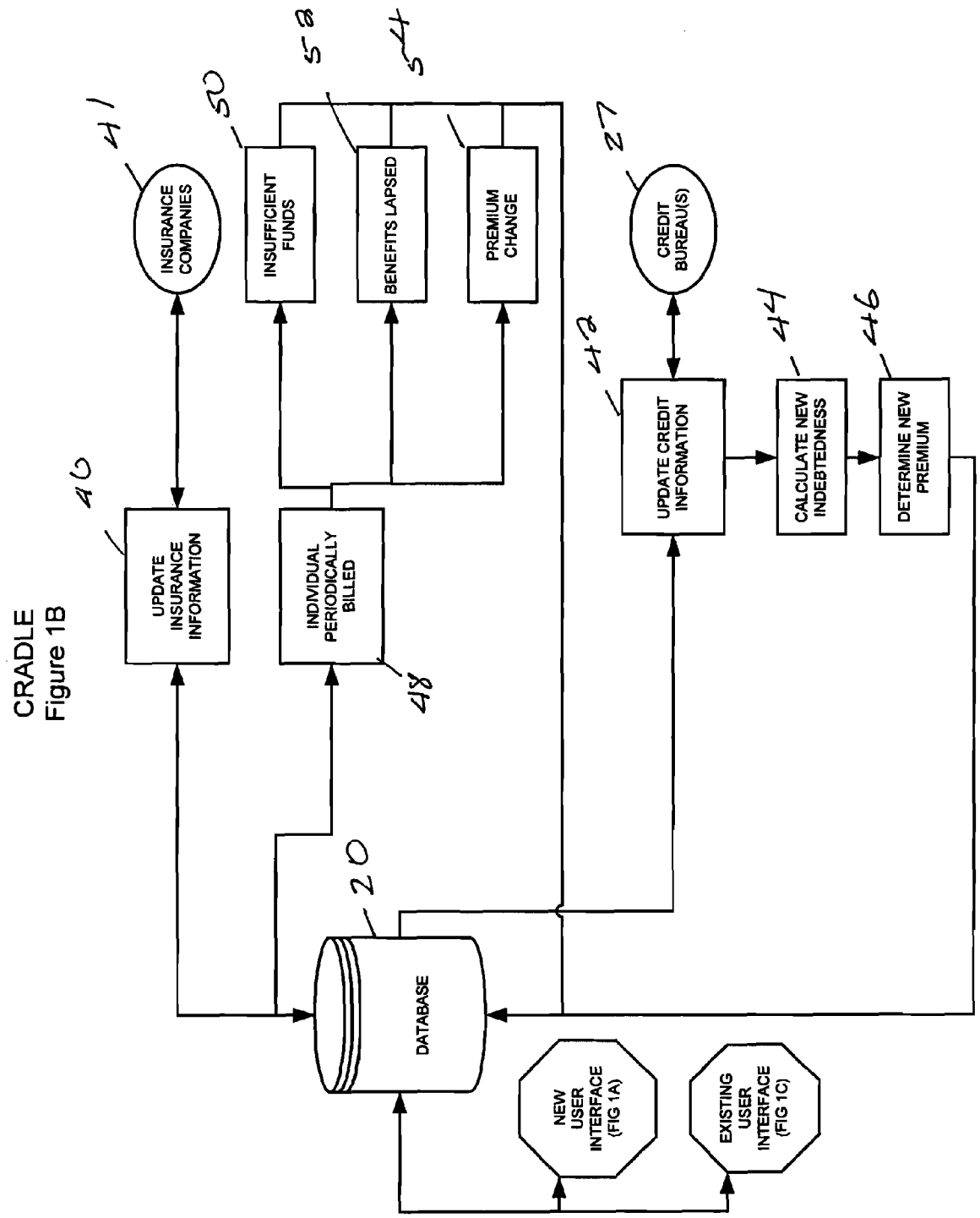
FIG. 1B is a second part of an overall flow chart of the credit life insurance benefits consolidation services organization's computer program. In particular.
Figure 1C:
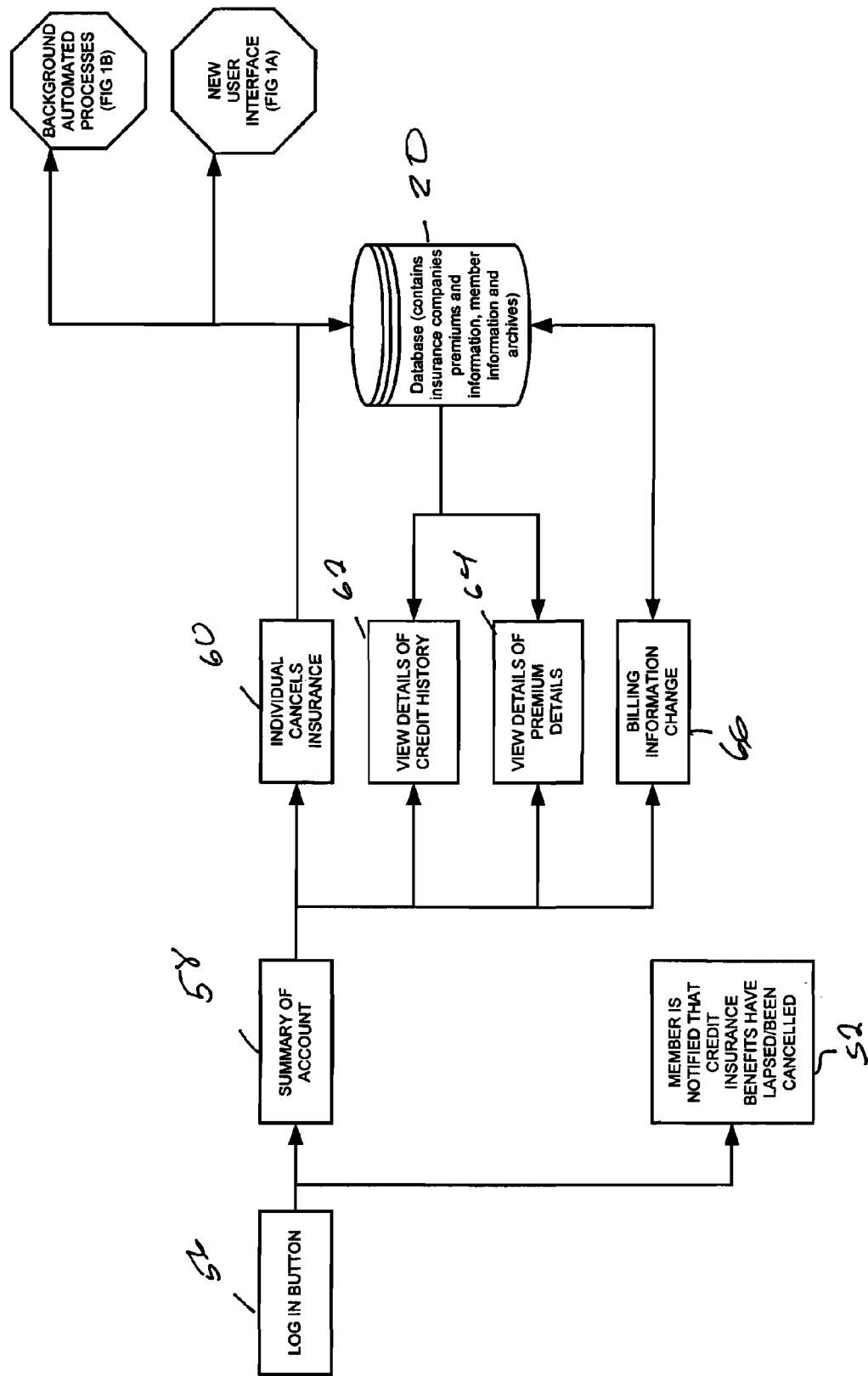
FIG. 1C is a third part of an overall flow chart of the credit life insurance benefits consolidation services organization's computer program. In particular.

In detail, the method as illustrated in FIG. 1 is comprised of the following steps which will be accomplished online (Internet) using the individual's own personal computer in conjunction with the credit life insurance consolidation service organization's computer and database. The credit life insurance service organization establishes a database consisting of insurance companies that provide credit life insurance in each state and the premiums the insurance company's charge for issuing their credit life insurance benefits. The information is stored in the Database indicated by numeral 20 in FIGS. 1A, 1B and 1C. The individuals account history (to be subsequently discussed) is also stored in the database.

The individual calls up the web page and the screen shown in FIG. 2 appears. The individual can log in or if not a member the individual can subscribe by selecting Register, which brings them to the screen shown in FIG. 3. Once the individual registers they can select a password for further access to the individual's account. Thereafter, the following steps take place:

Step 22. Individual Registers—The Individual registers online with the service organization. The registration includes the individual's personal information 22A as well as credit-card information 22B as may be necessary to cover the service organization fees for servicing the individual's credit life insurance benefits needs and to cover the premiums for credit life insurance benefits. Note that the screen in FIG. 3 provides for entering a credit card number. This credit card will be used to pay service organization's fees and any insurance premiums.

Step 24. Individual Accepts Terms of Service—Individual authorizes the service organization to obtain the individual's Total Indebtedness Credit Report (TICR) from one or more credit reporting bureaus. The TICR may also be required to delineate the various debts, which comprise the individual's total indebtedness. The computer terminal screen for the individual to authorize the service organization to obtain the necessary information is shown in FIG. 4.

Step 26. Request Credit Information—The service organization requests the TICR from the credit reporting bureaus, indicated by numeral 27.

Step 28. Indebtedness Determined—Using the information received from the individual's TICR, service organization determines the amount of indebtedness, which should be insured.

Step 30. Determine Premium—Using the individual's state and total amount of insurable indebtedness as a basis, service organization refers to its insurance company data base and determines the insurer and premium for single credit life insurance benefits to cover all of the individual's indebtedness during a pre-selected insurance period.

Step 32. Advise Individual—Service organization advises the individual of the appropriate premium for credit life insurance benefits to cover the individual's total indebtedness as shown in FIG. 8.

Step 36. Individual Authorizes Policy—The individual authorizes service organization to obtain selected amounts of credit life insurance benefits and to charge the premium to the pre-designated credit card. In the event the individual desires more than the total amount of indebtedness, the individual may elect to add certain clear categories of indebtedness i.e. home mortgage indebtedness is to be covered by the credit life insurance benefits.

Step 38. Check Credit Card—In the event the individual's pre-designated credit card company advises service organization that the individual has insufficient credit available to cover the premium charge, the service organization will immediately notify the individual and request an alternative source of credit as shown in FIG. 10. If no acceptable credit source becomes available, the credit life insurance benefits account will be cancelled and the individual notified.

At this point the individual has obtained credit life insurance benefits. Once the individual is initially covered there is an on-going update program in operation. Referring to FIG. 1B Step 40. Update Insurance Information—The insurance companies 41 are periodically contacted to obtain latest credit insurance benefits and premium changes.

Step 42. Update Credit Information—The credit reporting bureau(s) 27 are periodically contacted to obtain updated credit reports to obtain TICR.

Step 44. Calculate New Indebtedness (TICR)

Step 46. Determine New Premium—Results added to database.

Step 48. Individual Periodically Billed—The individual's credit card is automatically billed.

The individual is informed and the following information is stored in the database 20:

Step 50. Insufficient Funds—The individual is notified via the Internet that the credit card has reached its limit or otherwise will not accept charges. The E-mail message is provide in FIG. 10.

Step 52. Benefits Lapsed—The individual is notified via the Internet that the benefits have lapsed for some reason. The E-mail message is shown in FIG. 12.

Step 54. Premium Change—The individual is notified via the Internet that the premium has changed due to a change in the TICR and/or credit insurance benefit rates. The E-mail message is shown in FIG. 6.

Referring to FIG. 1C, the individual can log onto the web site via the Internet thereafter by pressing Log In Button 56 shown in FIG. 2, computer terminal screen. Thereafter:

Step 58. Summary of Account—The individual is presented with the computer terminal screen depicted in FIG. 7. By clicking on the appropriate button, the individual can bring up four separate screens from the database 20.

Step 60. Individual Cancels Insurance—The account is closed and the E-mail message shown in FIG. 14 is sent to the individual.

Step 62. View Details of Credit History—The computer terminal screen shown in FIG. 9 appears.

Step 64. View Details of Premium Details—The computer terminal screen shown in FIG. 6 appears.

Step 66. Billing Information Change—The computer terminal screen shown in FIG. 13 appears.

Credit life insurance benefits generally includes insurance benefits for the individual in the event of one or more of the following, but are not limited to: natural or accidental death, unemployment, layoff, medical withdrawal or hospitalization, dread disease or critical illness, dismemberment, short-term or long-term disability, natural disaster, etc. While only a few events for which the credit insurance benefits provide protection for are discussed above, one skilled in the art would know that other types of events could be covered by the credit life insurance benefits.

As shown in FIG. 5, the service organization also presents information to the individual related to the debt of the individual and also presents information which classifies the debt into a plurality of debt categories. This service organization also allows the individual to select which of the plurality of debt categories the credit balance insurance benefits will be set to cover. These debt categories can include, but are not limited to: revolving loans, credit card debt, short-term loans, long-term loans, secured and unsecured real estate loans, mortgages, auto loans, payday loans and business loans. While these are only a few of the debt categories that can be used, one skilled in the art would know that any type of debt found in a credit report could be classified and presented as a debt category.

At step 28, the amount of the individual's indebtedness which should be insured, includes, but is not limited to, the total credit balance, portions of the total credit balance, monthly payments due or minimum monthly payments due. Therefore, at step 30, the service organization determines the insurer and premium for credit life insurance benefits to cover the total credit balance or portions of the total credit balance such as periodic payments due (i.e., monthly payments) or minimum periodic payments due (i.e., minimum monthly payments) and thereby maintain an individual's access to credit.

Thus it can be seen that the embodiments described herein allow an individual to secure credit life insurance benefits. Furthermore, the benefits are automatically increased or decreased periodically depending upon the individual's total indebtedness. This protection continues until the individual cancels the benefits or their credit card can no longer accept charges.

The information obtained from the credit reporting bureau can come from a variety of sources including, but not limited to, credit reports and summary reports. For example, in one embodiment, the information obtained from the credit reporting bureau used to determine the amount of debt owed by the individual is taken from a summary report that does not include actual payment data.

While the embodiments herein have been described with reference to a particular embodiment, it should be understood that the embodiment is merely illustrative, as there are numerous variations and modifications, which may be made by those skilled in the art. Thus, the embodiments described herein are to be construed as being limited only by the spirit and scope of the appended claims.

I claim:

1. A method comprising:
obtaining authorization from an individual to obtain credit information from a credit reporting bureau; and
using one or more computer processing units, on a periodic basis:
accessing credit information of the individual from a credit reporting bureau;
based on at least the credit information of the individual, determining an amount of debt owed by the individual;

classifying the amount of debt owed by the individual into a plurality of debt categories, based on indications in the credit information of types of debts associated with respective debts in the credit information;

providing a user interface to the individual indicating respective amounts of debt owed by the individual in respective debt categories;

receiving a selection of one or more of the debt categories to be insured; and determining how much of the amount of debt owed by the individual is to be covered by aggregated insurance benefits based on at least the selection of debt categories and the amounts of debt associated with the selected debt categories.

2. The method of claim 1, wherein the amount of debt owed by the individual is a total debt amount, a periodic payment amount or a minimum periodic payment amount.

3. The method of claim 2, wherein the periodic payment amount is a monthly payment amount and the minimum periodic payment amount is a minimum monthly payment amount.

4. The method of claim 1, wherein insurance benefits for the individual are provided in the event of one or more of the following:

natural or accidental death, unemployment, layoff, medical withdrawal or hospitalization, dread disease or critical illness, dismemberment, short-term or long-term disability, natural disaster.

5. The method of claim 1, wherein the information obtained from the credit bureau used to determine the amount of debt owed by the individual is taken from a summary report.

6. The method of claim 1, further comprising: on a periodic basis, determining whether an insurance premium associated with the amount of debt owed by the individual has changed, and transmitting a notification to the individual if it is determined that the insurance premium has changed.

7. A computer-implemented system comprising:

a computer processor configured to execute software code stored on a computer readable medium in order to cause the computer-implemented system to:

obtain authorization from the individual to contact and obtain credit information from a credit reporting bureau;

periodically access credit information of an individual from a credit reporting bureau;

classify debts owed by the individual into a plurality of debt categories, based on indications in the credit information of types of debts associated with respective debts in the credit information;

receive a selection of one or more of the debt categories to be insured; and determine how much of the amount of debt owed by the individual is to be covered by aggregated insurance benefits based on at least the selection of debt categories and the amounts of debt associated with the selected debt categories.

8. The computer-implemented system of claim 7, wherein the amount of debt owed by the individual is a total debt amount, a periodic payment amount or a minimum periodic payment amount.

9. The computer-implemented system of claim 7, wherein the periodic payment amount is a monthly payment amount and the minimum periodic payment amount is a minimum monthly payment amount.

10. The computer-implemented system of claim 7, wherein insurance benefits for the individual are provided in the event of one or more of the following:

natural or accidental death, unemployment, layoff, medical withdrawal or hospitalization, dread disease or critical illness, dismemberment, short-term or long-term disability, natural disaster.

11. The computer-implemented system of claim 7, wherein the information obtained from the credit bureau used to determine the amount of debt owed by the individual is taken from a summary report.

12. The computer-implemented system of claim 7, wherein the software code is further configured to cause the computer-implemented system to determine, on a periodic basis, whether an insurance premium associated with the amount of debt owed by the individual has changed, and to transmit a notification to the individual if it is determined that the insurance premium has changed.

13. The method of claim 1, wherein the debt categories are selected from two or more of the following debt categories: revolving loans, credit card debt, short-term loans, long-term loans, secured real estate loans, unsecured real estate loans, mortgages, auto loans, payday loans and business loans.

14. The computer-implemented system of claim 7, wherein the debt categories are selected from two or more of the following debt categories: revolving loans, credit card debt, short-term loans, long-term loans, secured real estate loans, unsecured real estate loans, mortgages, auto loans, payday loans and business loans.

* * * * *